United States Patent
Li et al.

(10) Patent No.: US 10,020,967 B1
(45) Date of Patent: Jul. 10, 2018

(54) PAM-N JITTER/NOISE DECOMPOSITION ANALYSIS

(71) Applicant: Intel Corporation, Santa Clara, CA (US)

(72) Inventors: Mike Peng Li, Palo Alto, CA (US); Hsinho Wu, Santa Clara, CA (US); Masashi Shimanouchi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/443,791

(22) Filed: Feb. 27, 2017

Related U.S. Application Data

(60) Provisional application No. 62/380,266, filed on Aug. 26, 2016.

(51) Int. Cl.
*H04L 27/04* (2006.01)
*H04L 27/06* (2006.01)
*H04L 7/02* (2006.01)

(52) U.S. Cl.
CPC ............... *H04L 27/06* (2013.01); *H04L 7/02* (2013.01); *H04L 27/04* (2013.01)

(58) Field of Classification Search
CPC . H04L 7/02; H04L 27/04; H04L 27/06; H04L 27/2688; H04L 1/205; H04B 1/0475; H04B 1/10; H04B 1/1027; H04B 1/1036; H04B 15/00; H04B 15/005
See application file for complete search history.

(56) References Cited

U.S. PATENT DOCUMENTS

| | | | |
|---|---|---|---|
| 9,444,588 B1* | 9/2016 | Katic | H04L 1/203 |
| 2012/0014416 A1* | 1/2012 | Dabiri | H03H 21/0012 375/144 |
| 2012/0053953 A1* | 3/2012 | Giust | G06Q 30/0278 705/1.1 |
| 2012/0128049 A1* | 5/2012 | Dabiri | H04B 1/1027 375/224 |

* cited by examiner

Primary Examiner — Siu Lee
(74) Attorney, Agent, or Firm — Fletcher Yoder, P.C.

(57) ABSTRACT

A method includes receiving an n-level Pulse Amplitude Modulated (PAM-n) signal at a receiver from a transmitter via a channel. The method also includes determining one or more sampling times of the PAM-n signal. The method further includes determining one or more slicing levels of the PAM-n signal. The method also includes extracting and decomposing jitter in the PAM-n signal for each slicing level of the PAM-n signal to determine one or more jitter components. The method further includes extracting and decomposing noise in the PAM-n signal for each data level of the PAM-n signal to determine one or more noise components. The method also includes adjusting the receiver, the transmitter, the channel, or any combination thereof, based on the one or more jitter components, the one or more noise components, or both.

20 Claims, 8 Drawing Sheets

PAM-N JITTER/NOISE DECOMPOSITION ANALYSIS

CROSS-REFERENCE TO RELATED APPLICATION

This application claims priority to and benefit from U.S. Provisional Application No. 62/380,266, filed Aug. 26, 2016, entitled "PAM-N JITTER/NOISE DECOMPOSITION ANALYSIS USING FPGA, EYE MONITOR, AND SIMULATIONS," the contents of which is incorporated by reference in its entirety.

BACKGROUND

This disclosure relates generally to improving data recovery in signal communication and, more particularly, to extracting and decomposing jitter and noise in received n-level Pulse Amplitude Modulation (PAM-n) signals (where n is greater than 1).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Accurately communicating data using high-speed input/output (HSIO) signals is of increasing interest and value to electronic system designers and users. As high-speed input/output data rates exceed 50 gigabits per second (Gbps), n-level Pulse Amplitude Modulation (PAM-n) modulation schemes may be used so that high-speed input/output communication links may more efficiently communicate data with high performance. Pulse Amplitude Modulation (PAM) is a form of signal modulation that communicates data by encoding the data in the amplitude of a series of signal pulses. The amplitude of the series of signal pulses may be varied according to the sample value of the data. PAM-n refers to the number of possible pulse amplitudes in the PAM signal. For example, a PAM-4 signal indicates that there are 4 possible discrete pulse amplitudes.

A communication link used with a PAM-n modulation scheme may scale in an electrical or optical signal amplitude domain while preserving a timing budget. For example, a PAM-4 signal may encode up to two times the information a typical PAM-2 signal may encode while the timing budget for the PAM-4 signal may be approximately the same as the PAM-2 signal. Additionally, the bandwidth of the communication link may be reserved such that cost of a communication system may be maintained or reduced. That is, the additional pulse amplitudes used to encode information in a PAM-n signal may enable a reduction in bandwidth of the corresponding communication link while still maintaining the same data rate, resulting in maintaining or even reducing costs of the communication system.

However, increasing the data rate in the communication system could add jitter and noise to the communication link. Extracting and decomposing jitter and noise components from a signal received over the communication link may thus improve the received signal. While decomposing jitter and noise of a received signal is known for single data level or symbol signals, such decomposition has not been performed on signals of PAM-n modulation schemes, which may be much more complex since jitter and noise are level dependent.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes systems and methods for improving data recovery in signal communication and, more particularly, to extracting and decomposing jitter and noise in received n-level Pulse Amplitude Modulated (PAM-n) signals (where n is greater than 1). By extracting and decomposing jitter and noise components from a PAM-n signal transmitted and received over a communication link, PAM-n communication performance may be improved by adjusting the communication link to compensate for the jitter and noise components. Moreover, jitter and/or noise as a result of transmitter pre-emphasis may be identified and/or recognized.

Accordingly, systems and methods are described that include receiving an n-level Pulse Amplitude Modulated (PAM-n) signal at a receiver from a transmitter via a communication link. Effects of a finite impulse response applied by the transmitter may be de-embedded from the received PAM-n signal. Sampling times and slicing levels of the PAM-n signal may then be determined. The determination of the sampling times and slicing levels may be iterated using previously determined sampling times and slicing levels to achieve stable values. For each slicing level, jitter may be extracted from the PAM-n signal, and the jitter may be decomposed into one or more jitter components. For each data or symbol level, noise may be extracted from the PAM-n signal, and the noise may be decomposed into one or more noise components. The communication link may then be adjusted based on the one or more jitter components, the one or more noise components, or any combination thereof.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Techniques for improving data recovery in signal communication, and more particularly to extracting and decomposing jitter and noise in received n-level Pulse Amplitude Modulated (PAM-n) signals (where n is greater than 1), are disclosed. By decomposing a PAM-n signal received over a communication link into jitter and noise components, PAM-n communication performance may be improved by adjusting the communication link to compensate for the jitter and noise in the PAM-n signal. Moreover, jitter and noise as a result of transmitter pre-emphasis may be identified and compensated for.

Figure 1:
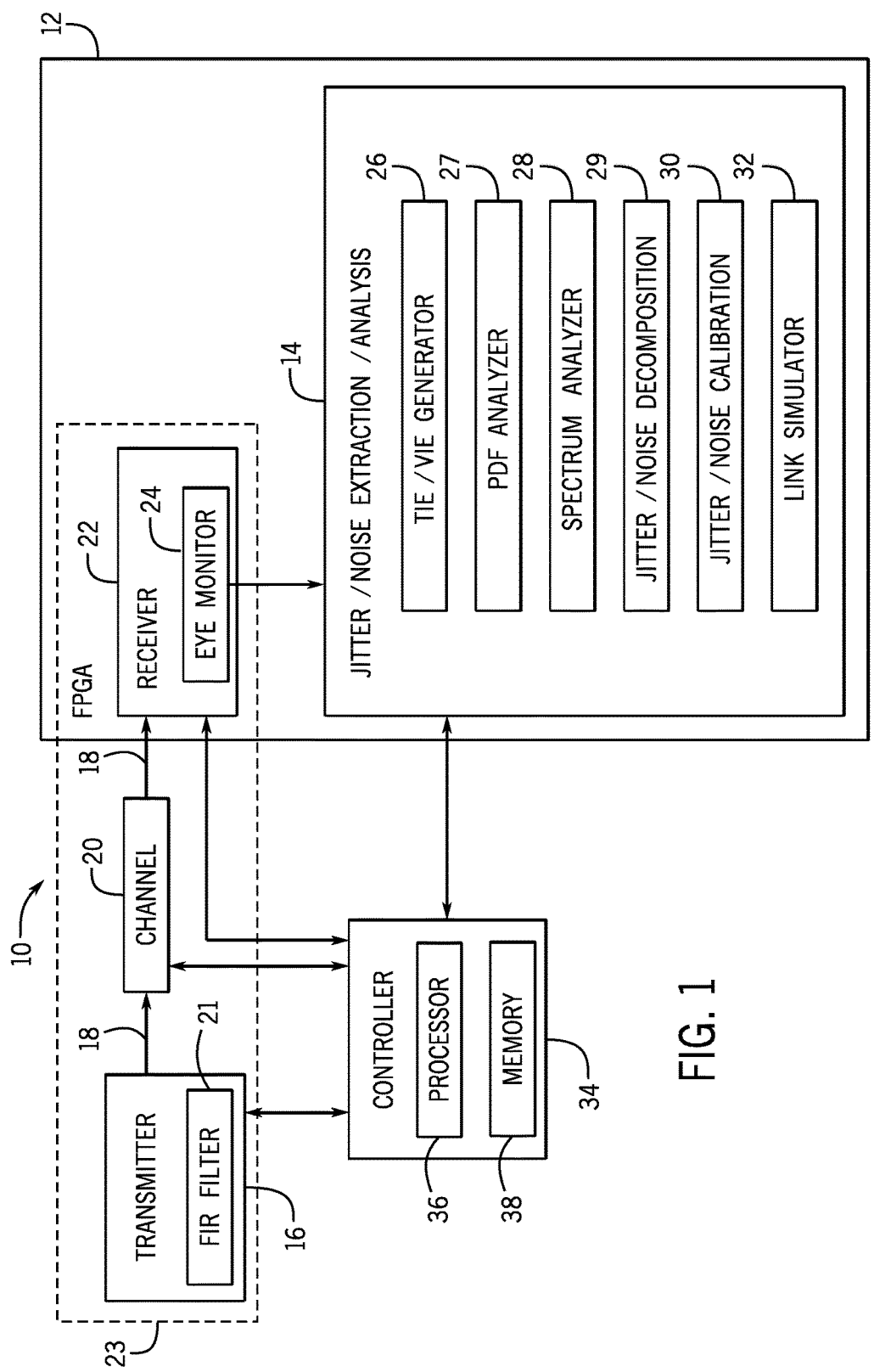
FIG. 1 is a block diagram of a system that includes an integrated circuit having jitter/noise extraction/analysis circuitry, in accordance with an embodiment of the present disclosure.

FIG. 1 is a block diagram of a system that includes an integrated circuit (e.g., a field programmable gate array (FPGA) 12) having signal processing circuitry (e.g., jitter/noise extraction/analysis circuitry 14), in accordance with an embodiment of the present disclosure. A transmitter 16 may send a PAM-n signal 18 (where n is greater than 1) via an input/output channel 20. The transmitter 16 may be part of another integrated circuit (e.g., another FPGA). In some embodiments, the transmitter 16 may include a finite impulse response (FIR) filter 21. The transmitter 16 may use the FIR filter 21 to pre-emphasize, amplify, and/or otherwise modify the PAM-n signal 18 to improve reception and/or quality of the PAM-n signal 18. In some embodiments, the input/output channel 20 may be a high speed input/output (HSIO) channel.

The FPGA 12 receives the PAM-n signal 18 via a receiver 22. The transmitter 16, channel 20, and receiver 22 may form a high-speed input/output communication link 23. While the FPGA 12 is used as an example of the integrated circuit, it should be understood that any suitable integrated circuit may be substituted for the FPGA 12, such as another type of programmable logic device (PLD), an application specific integrated circuit (ASIC), application specific standard product (ASSP), and the like. The receiver includes an eye monitor 24 that may measure characteristics (e.g., sampling time) of the PAM-n signal 18 and provide information to analysis algorithms (e.g., jitter/noise decomposition algorithms).

The jitter/noise extraction/analysis circuitry or block 14 may include various circuitry used to extract and/or analyze jitter/noise from the PAM-n signal 18. The jitter/noise extraction/analysis circuitry 14 may include a time interval error (TIE)/voltage interval error (VIE) generator 26 may extract jitter and/or noise from the PAM-n signal 18. The jitter/noise extraction/analysis circuitry 14 may include a probability distribution function (PDF) analyzer 27 that uses random probability distribution analysis to determine jitter and/or noise in the PAM-n signal 18. The jitter/noise extraction/analysis circuitry 14 may also include a spectrum analyzer 28 that uses amplitude and frequency of the PAM-n signal 18 to determine jitter and/or noise in the PAM-n signal 18. The jitter/noise extraction/analysis circuitry 14 may include a jitter/noise decomposition circuitry 29 may decompose jitter and/or noise in the PAM-n signal 18 into jitter and/or noise components. For example, the jitter/noise decomposition circuitry or block 29 may use one or more decomposition algorithms to split jitter/noise extracted by the TIE/VIE generator 26 into a jitter/noise probability distribution function analysis and a jitter spectrum analysis. Jitter/noise components may then be determined using the jitter/noise probability distribution function analysis and the jitter/noise spectrum analysis. The jitter/noise extraction/analysis circuitry 14 may include a jitter/noise calibration circuitry or block 30 may verify jitter/noise components from the PAM-n signal 18 and/or calculate adjustments to reduce jitter and/or noise in the PAM-n signal 18. Such adjustments may be sent to the transmitter 16, the channel 20, and/or the receiver 22. The jitter/noise extraction/analysis circuitry 14 may also include a link simulator 32 that generates a model high-speed input/output communication link. In some embodiments, jitter/noise extraction and/or analysis may be performed on the model high-speed input/output communication link.

The system 10 also includes a controller 34 that may communicatively couple to the transmitter 16, the channel 20, and the FPGA 12. The controller 34 may include any suitable control logic that extracts and/or analyzes jitter and/or noise in the PAM-n signal 18. For example, the controller 34 may include or be part of one or more processors 36 (e.g., microprocessors) that may execute software programs (e.g., jitter/noise decomposition software programs) to extract and/or analyze jitter and/or noise in the PAM-n signal 18. Moreover, the processor(s) 36 may include one or more microprocessors, one or more integrated circuits (e.g., application specific integrated circuits (ASICs), field programmable gate arrays (FPGAs), reduced instruction set (RISC) processors, and the like), or some combination thereof. The controller 34 may couple to one or more memory devices 38 that may store information such as control software look up tables, configuration data, etc. In some embodiments, the processor(s) 36 and/or the memory device(s) 38 may be external to the controller 34. The memory device(s) 38 may include a tangible, non-transitory, machine-readable-medium, such as a volatile memory (e.g., a random access memory (RAM)) and/or a nonvolatile memory (e.g., a read-only memory (ROM)). The memory device(s) 38 may store a variety of information and be used for various purposes. For example, the memory device(s) 38 may store machine-readable and/or processor-executable instructions (e.g., firmware or software) for the processor(s) 36 to execute, such as instructions to extract and/or analyze jitter and/or noise in the PAM-n signal 18. The memory device(s) 38 may include one or more storage devices (e.g., nonvolatile storage devices) that may include read-only memory (ROM), flash memory, a hard drive, or any other suitable optical, magnetic, or solid-state storage medium, or any combination thereof.

While the components (e.g., the TIE/VIE generator 26, the jitter/noise decomposition circuitry 29, the jitter/noise calibration circuitry 30, and the link simulator 32) of the jitter/noise extraction/analysis circuitry 14 are illustrated as part of the jitter/noise extraction/analysis circuitry 14, it should be understood that any or all of the components may instead be disposed outside the jitter/noise extraction/analysis circuitry 14 or outside the FPGA 12 (e.g., in the controller 34).

Figure 2:
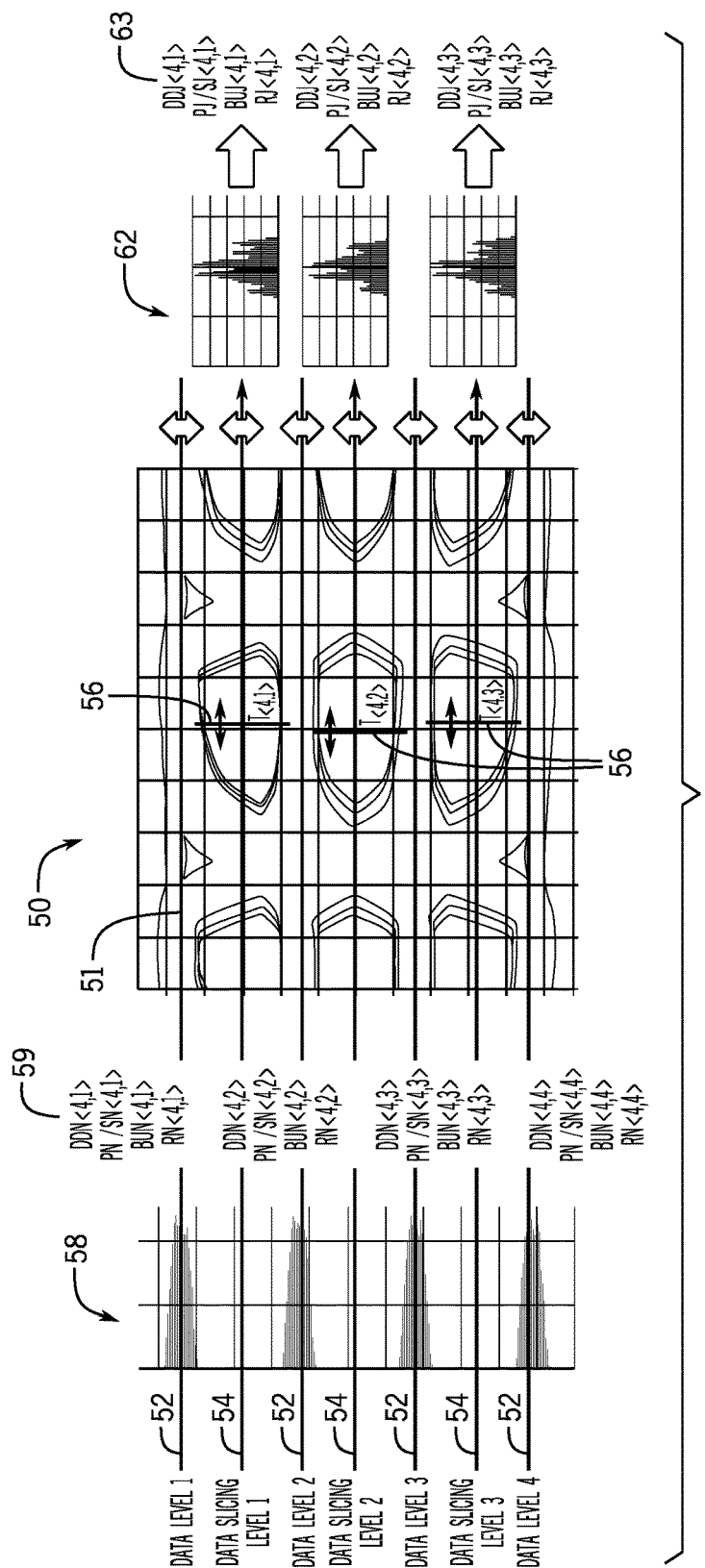
FIG. 2 is an eye diagram for a PAM-4 signal received at a receiver of the integrated circuit of FIG. 1, in accordance with an embodiment of the present disclosure.

FIG. 2 is an eye diagram 50 for a PAM-4 signal 51 received at the receiver 22 of FIG. 1, in accordance with an embodiment of the present disclosure. While a PAM-4 signal is illustrated and used as an example in the present disclosure, it should be understood that techniques of the present disclosure may apply to any number of levels or symbols of PAM signals (e.g., PAM-2, PAM-8, PAM-16, and the like). Furthermore, while the PAM-4 signal 51 may be referred to and/or described as an electrical signal, it should be understood that the present disclosure may also apply to other signals, such as optical signals. As illustrated, the horizontal axis of the eye diagram 50 represented time (in picoseconds) and the vertical axis represents amplitude (in milliVolts).

For the PAM-4 signal 51, the eye diagram 50 includes four data levels or symbols p 52 (i.e., where p ranges from 1 to n, where n=4) that may correspond to four values. The controller 34 may analyze the eye diagram 50 and determine data slicing or slicer levels m 54 (i.e., data slicing levels 1-3) that facilitate determining what data level 52 a portion of the PAM-4 signal 51 indicates. For example, if a portion of the PAM-4 signal 51 is between data slicing level 1 and data slicing level 2, the controller 34 may determine that the portion of the PAM-4 signal 51 indicates data level 2. The controller 34 may also determine sampling times 56 (i.e., $T_m$) such that sampling the PAM-4 signal 51 at the sampling times 56 may yield more accurate results.

The eye diagram 50 may be used to extract jitter and/or noise from the PAM-4 signal 51. As illustrated, a noise histogram 58 shows the noise in the PAM-4 signal 51. Specifically, the noise histogram 58 identifies four sources of noise in the PAM-4 signal 51. Each source of noise may be composed of multiple noise components 59, such as data-dependent noise (i.e., DDN<n, p>), periodic noise/sinusoidal noise (i.e., PN/SN<n, p>), bounded uncorrelated noise (i.e., BUN<n, p>), random noise (i.e., RN<n, p>), and the like.

Similarly, a jitter histogram 62 shows the jitter in the PAM-4 signal 51. Specifically, the jitter histogram 62 identifies three sources of jitter in the PAM-4 signal 51. Each source of jitter may be composed of multiple jitter components 63, such as data-dependent jitter (i.e., DDJ<n, m>), periodic jitter/sinusoidal jitter (i.e., PJ/SJ<n, m>), bounded uncorrelated jitter (i.e., BUJ<n, m>), random jitter (i.e., RJ<n, m>), and the like. By extracting and decomposing the jitter and/or noise in the PAM-n signal 18, the PAM-n communication link 23 may be more accurately characterized and/or improved.

Figure 3:
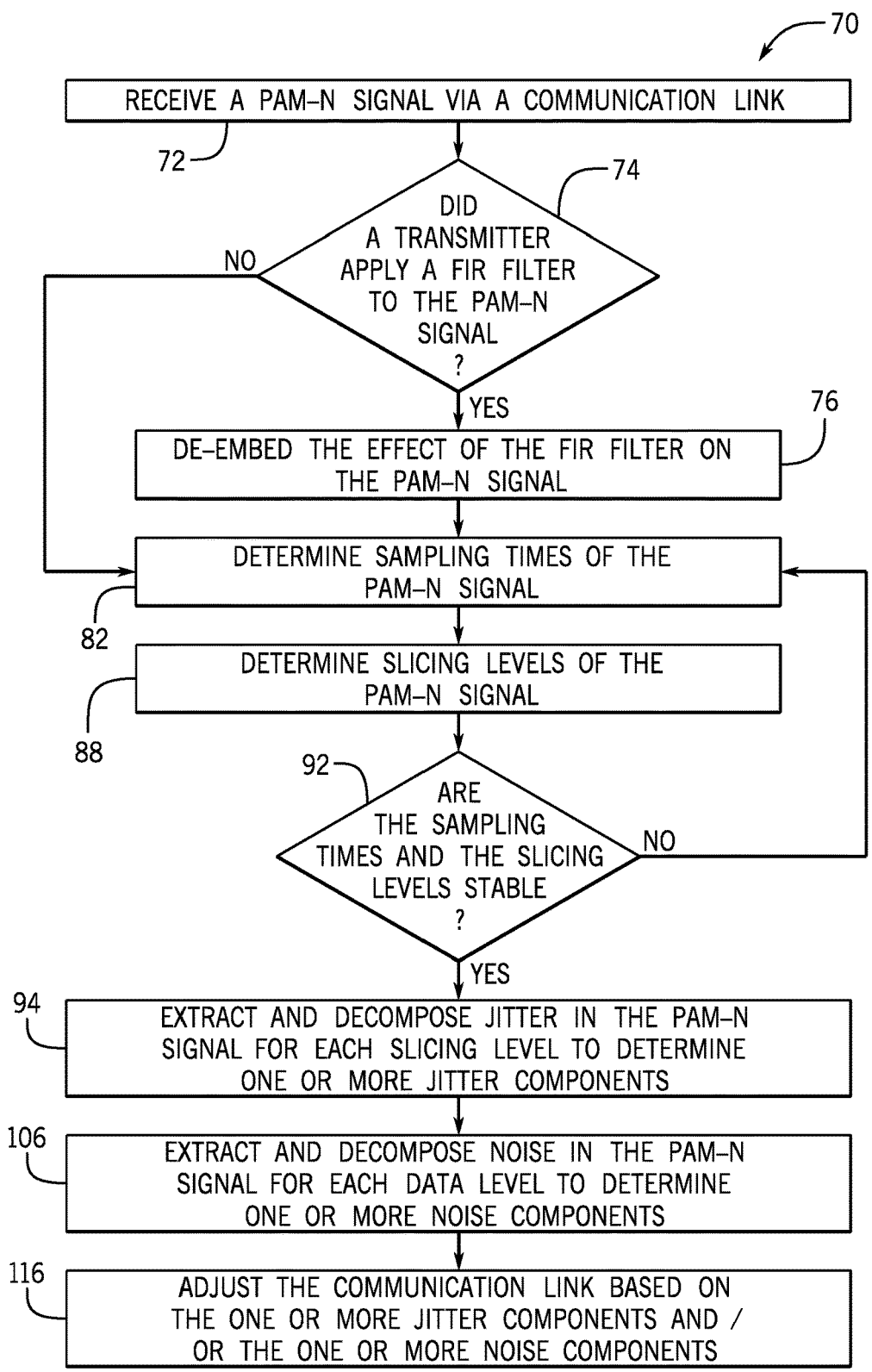
FIG. 3 is a flow diagram of a method for extracting and analyzing jitter and noise of a PAM-n signal received at the receiver of FIG. 1, in accordance with an embodiment of the present disclosure.

FIG. 3 is a flow diagram of a method 70 for extracting and analyzing jitter and noise of the PAM-n signal 18 of FIG. 1, in accordance with an embodiment of the present disclosure. The method 70 may be performed by any suitable device that may extract and analyze jitter and noise of the PAM-n signal 18, such as the controller 34. While the method 70 is described using steps in a specific sequence, it should be understood that the present disclosure contemplates that the describe steps may be performed in different sequences than the sequence illustrated, and certain described steps may be skipped or not performed altogether. In some embodiments, the method 70 may be implemented by executing instructions stored in a tangible, non-transitory, computer-readable medium, such as the memory device(s) 38, using a processor, such as the processor(s) 36.

Referring now to the method 70, the controller 34 may receive (process block 72) the PAM-n signal 18 via the communication link 23. As illustrated in FIG. 1, the controller 34 may receive the PAM-n signal 18 via the receiver 22. In some embodiments, the controller 34 may receive an eye monitor measurement of the PAM-signal (e.g., via the eye monitor 24). In other embodiments, the link simulator 32 may generate a model of the high-speed input/output communication link 23. As such, the controller 34 may receive the PAM-n signal 18 via the link simulator 32.

Figure 4:
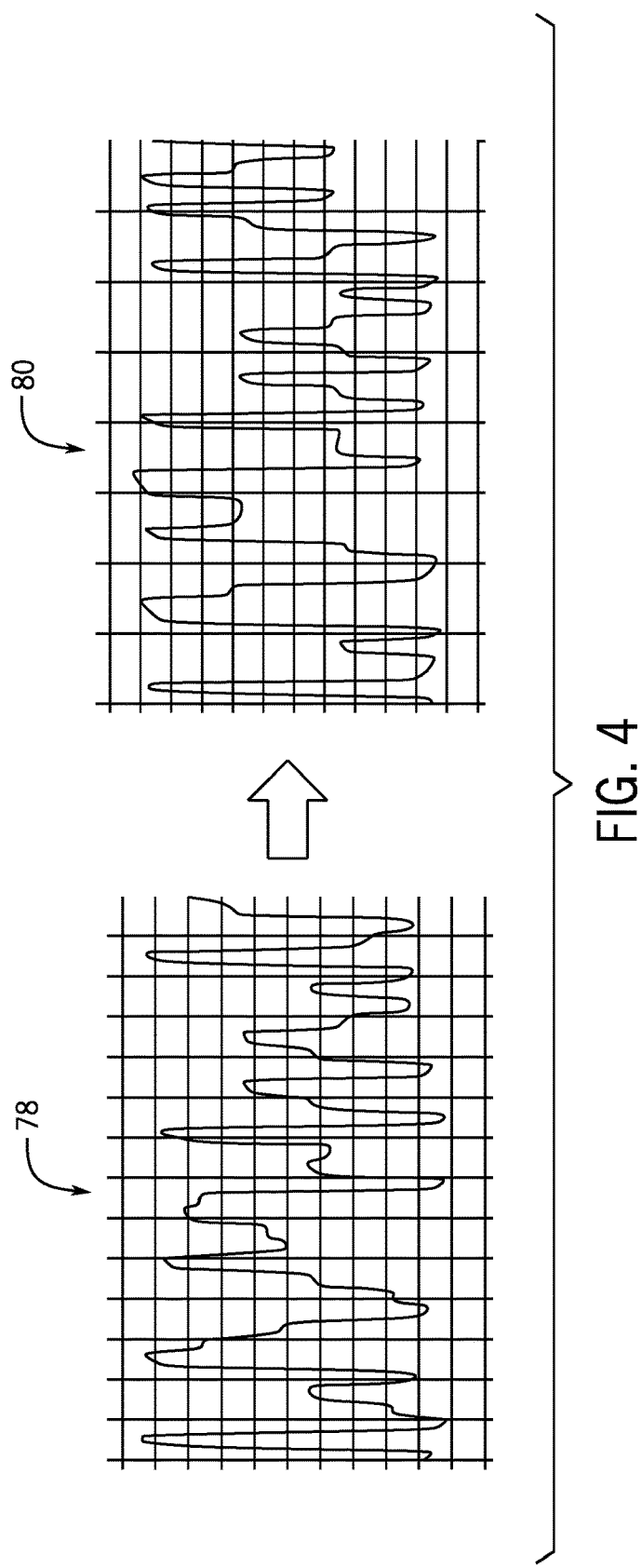
FIG. 4 is a set of plots that shows a PAM-n signal that was transmitted using a finite impulse response (FIR) filter and a subsequent PAM-n signal after de-embedding the effect of the FIR filter, in accordance with an embodiment of the present disclosure.

In some embodiments, the controller 34 may optionally de-embed an effect of the FIR filter 21 when the transmitter 16 uses the FIR filter 21 on the PAM-n signal 18. As such, the controller 34 may determine (decision block 74) whether the transmitter 16 applied the FIR filter 21 to the PAM-n signal 18. If so, the controller 34 may de-embed (process block 76) the effect of the FIR filter 21 on the PAM-n signal 18. That is, prior to sending the PAM-n signal 18, the transmitter 16 may use the FIR filter 21 to pre-emphasize, amplify, and/or otherwise modify the PAM-n signal 18 to improve reception and/or quality of the PAM-n signal 18. The controller 34, upon reception of the PAM-n signal 18, may de-embed the effect of the FIR filter 21 from the PAM-n signal 18 to realize more true or accurate characteristics of the transmitter 16 (e.g., to remove jitter and/or noise that is a result of applying the FIR filter 21). For example, FIG. 4 is a set of plots that show a PAM-n signal 78 that was transmitted using the FIR filter 21 and the subsequent PAM-n signal 80 after the controller 34 de-embedded the effect of the FIR filter 21, in accordance with an embodiment of the present disclosure. In this manner, jitter and/or noise caused by the transmitter 16 may be extracted and analyzed.

In some circumstances, such as when the transmitter 16 does not use the FIR filter 21 on the PAM-signal 18, the controller 34 may determine that an effect of the FIR filter 21 on the PAM-n signal 18 should not be de-embedded. As such, the controller 34 may skip process block 76.

Figure 5:
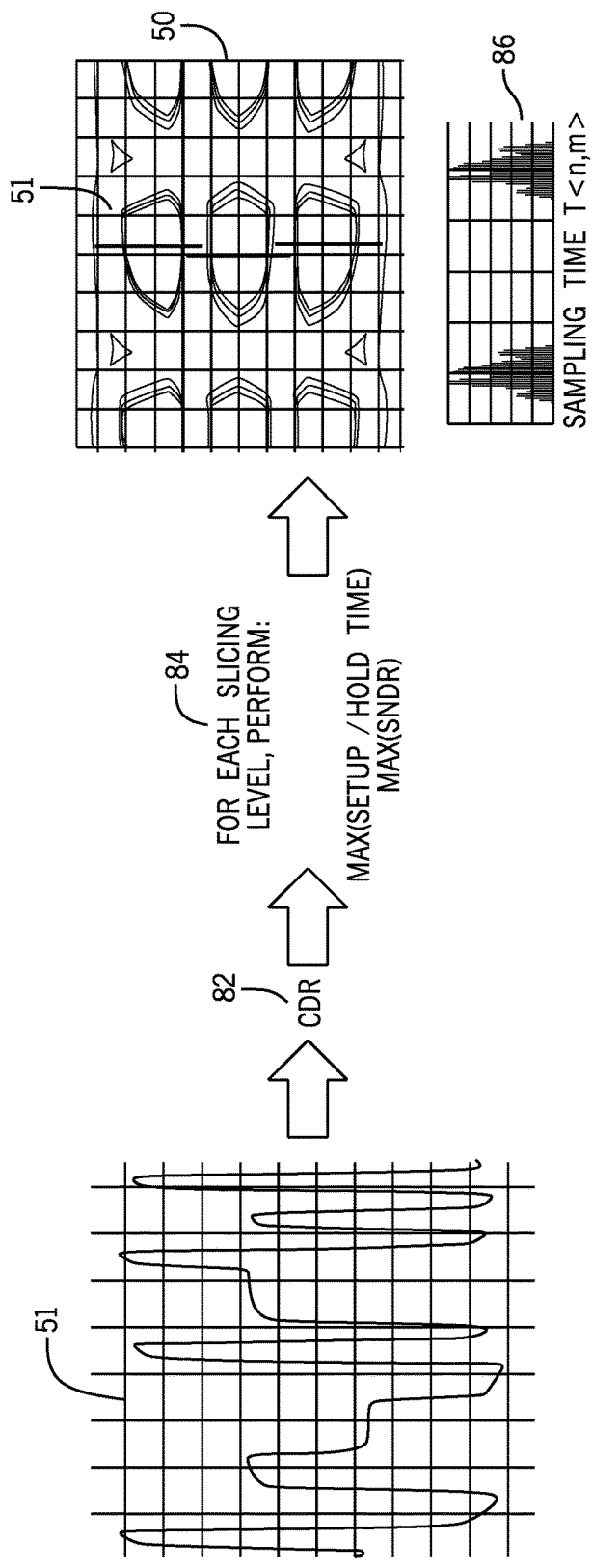
FIG. 5 is a flow diagram that shows a process for determining sampling times of the PAM-4 signal of FIG. 2, in accordance with an embodiment of the present disclosure.

The controller 34 determines (process block 82) one or more sampling times 56 of the PAM-n signal 18. FIG. 5 is a flow diagram that shows a process for determining the sampling times 56 of the PAM-4 signal 51 of FIG. 2, in accordance with an embodiment of the present disclosure. As illustrated, the controller 34 may perform a clock and data recovery procedure (CDR) 84 on the PAM-4 signal 51. Then, for each slicing level m 54, the controller 34 may perform a maximum setup/hold time operation and/or a maximum signal to distortion/noise ratio (SNDR) operation 86 to determine one or more sampling times (i.e., T<n, m>) 56. In some embodiments, each sampling time for each slicing level m 54 may be different.

Figure 6:
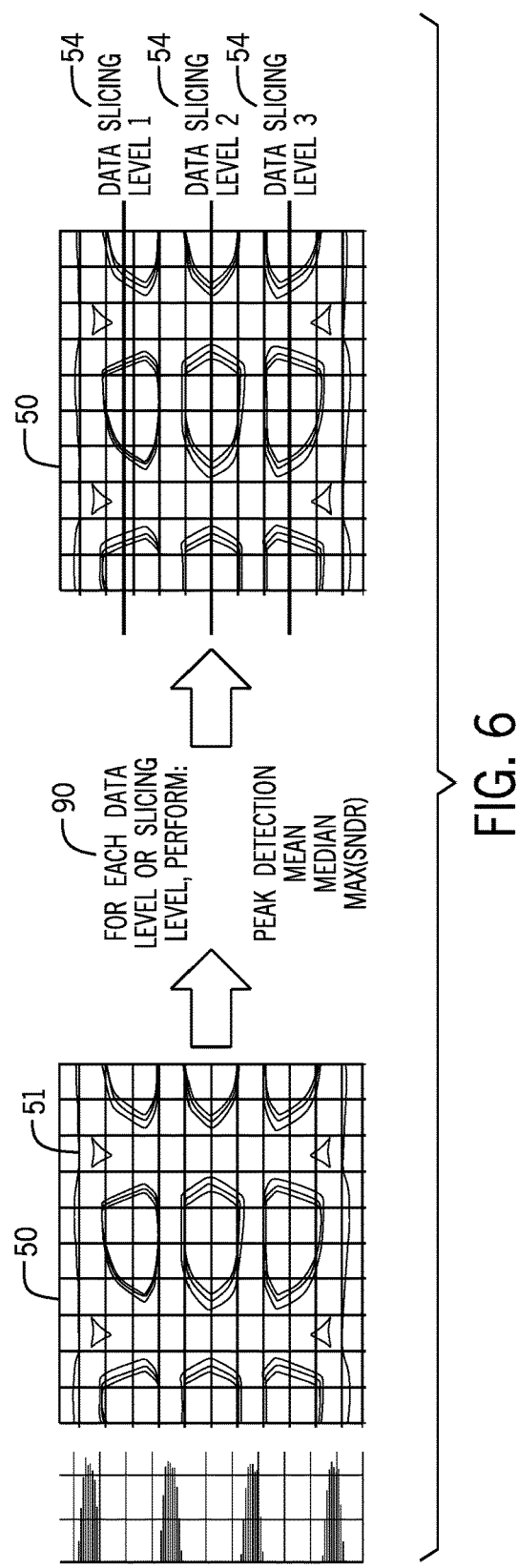
FIG. 6 is a flow diagram that shows a process for determining slicing levels of the PAM-4 signal of FIG. 2, in accordance with an embodiment of the present disclosure.

The controller 34 then determines (process block 88) one or more slicing levels 54 of the PAM-n signal 18. FIG. 6 is a flow diagram that shows a process for determining the slicing levels 54 of the PAM-4 signal 51 of FIG. 2, in accordance with an embodiment of the present disclosure. As illustrated, for each data level 52 or slicing level 54 of the received PAM-4 signal 51, the controller 34 may perform a peak detection operation, a mean operation, a median operation, and/or a maximum SNDR operation 90, to determine the data slicing levels 54.

In some embodiments, the controller 34 may iterate through process blocks 82 and 88 numerous times until the sampling times 56 (i.e., T<n, m>) and/or the slicing levels 54 become stable (e.g., such that the sampling times 56 and/or the slicing levels 54 are approximately the same values in subsequent iterations). As such, the controller 34 may determine (decision block 92) whether the sampling times 56 and the slicing levels 54 are stable. If not, the controller 34 may return to process block 82. For example, the controller 34 may determine (process block 82) first sampling times 56 (e.g., $T_1$<n, m>) by starting with initial or default slicing levels 54 (e.g., $S_0$<n, m>). Then, the controller 34 may determine (process block 88) first slicing levels 54 (e.g., $S_1$<n, m>) by using the first sampling times 56 (i.e., $T_1$<n, m>). In the next iteration, the controller 34 may determine (process block 82) second sampling times 56 (e.g., $T_2$<n, m>) using the first slicing levels 54 (e.g., $S_1$<n, m>). The controller 34 may then determine (process block 88) second slicing levels 54 (e.g., $S_2$<n, m>) by using the second sampling times 56 (i.e., $T_2$<n, m>), and so on.

Figure 7:
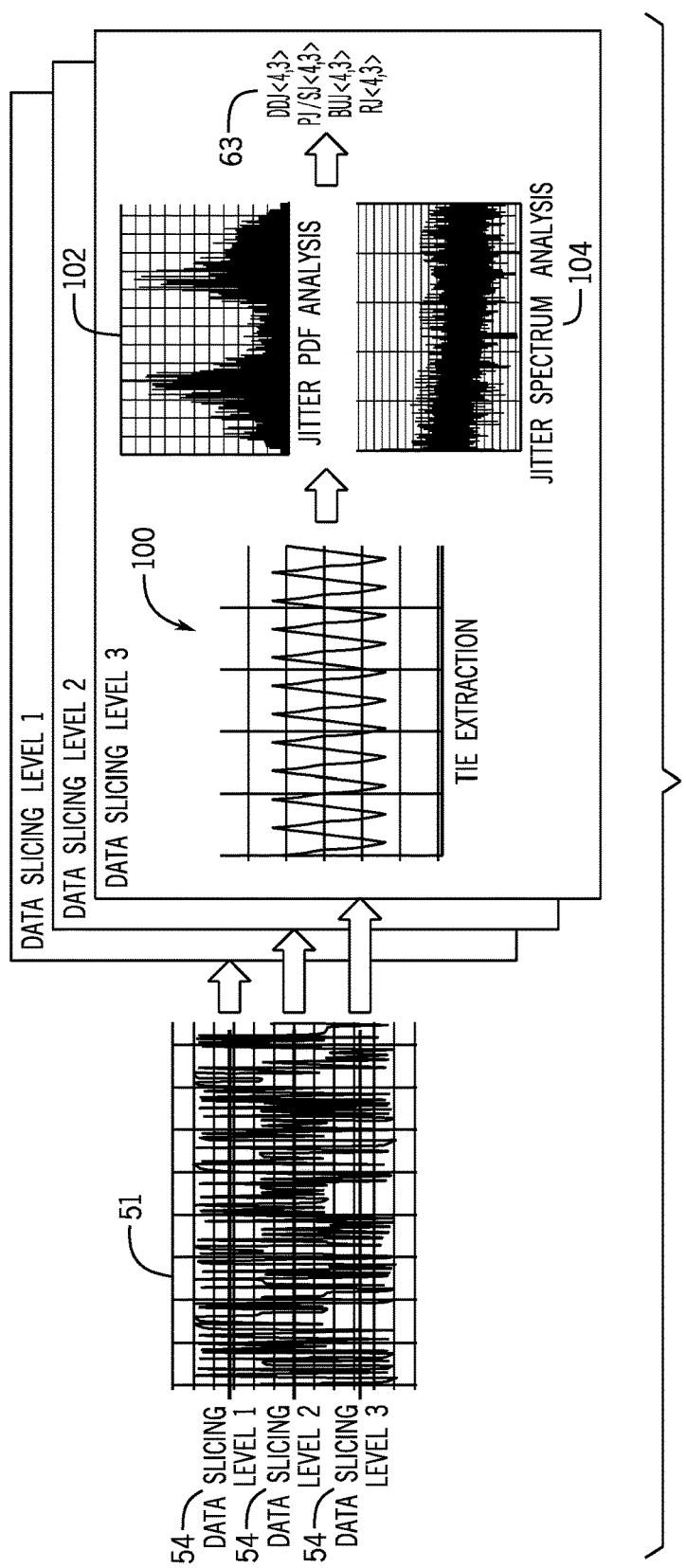
FIG. 7 is a flow diagram that shows a process for performing a jitter decomposition algorithm on the PAM-4 signal of FIG. 2, in accordance with an embodiment of the present disclosure.

If the controller 34 determines (decision block 92) that the sampling times 56 and the slicing levels 54 are stable, the controller 34 may extract and decompose (process block 94) jitter in the PAM-n signal 18 for each slicing level 54 to determine one or more jitter components 63. Specifically, the controller 34 may perform one or more jitter decomposition algorithms for each slicing level 54. The jitter decomposition algorithms may include any decomposition algorithm that decomposes jitter in the PAM-n signal 18 into jitter components 63. FIG. 7 is a flow diagram that shows a process for performing a jitter decomposition algorithm on the PAM-4 signal 51 of FIG. 2, in accordance with an embodiment of the present disclosure. As illustrated, the controller 34 may, for each slicing level 54, perform a time interval error (TIE) extraction 100 to extract jitter from the PAM-4 signal 51. The controller 34 may perform a jitter probability distribution function (PDF) analysis 102 (e.g., using the PDF analyzer 27) and a jitter spectrum analysis 104 (e.g., using the spectrum analyzer 28) on the extracted jitter for each slicing level 54 to determine the one or more jitter components 63, such as, for each slicing level m: data-dependent jitter (DDJ<n, m>), periodic/sinusoidal jitter (PJ/SJ<n, m>), bounded uncorrelated jitter (BUJ<n, m>), random jitter (RJ<n, m>), and the like.

Figure 8:
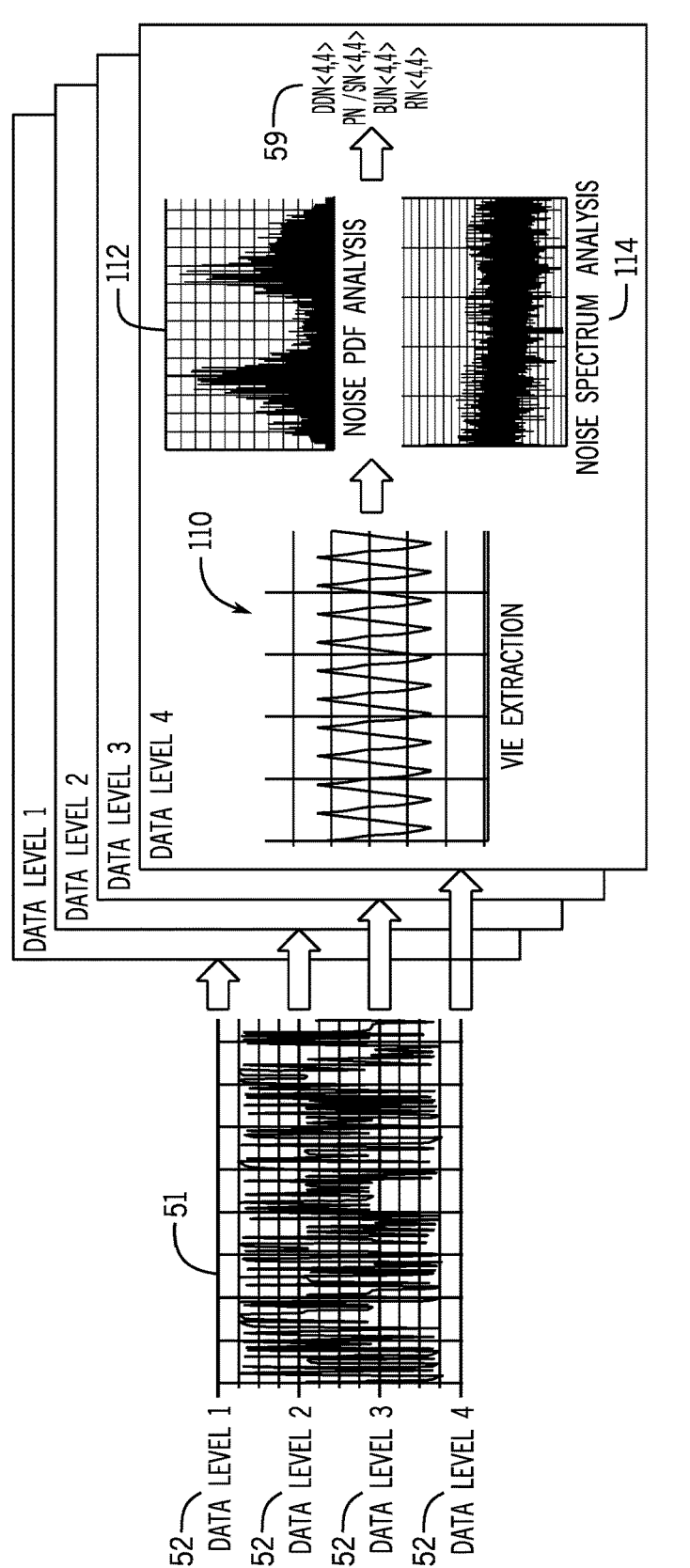
FIG. 8 is a flow diagram that shows a process for performing a noise decomposition algorithm on the PAM-4 signal 51 of FIG. 2, in accordance with an embodiment of the present disclosure

The controller 34 may extract and decompose (process block 106) noise in the PAM-n signal to determine one or more noise components 59. Specifically, the controller 34 may perform one or more noise decomposition algorithms for each data level 52. The noise decomposition algorithms may include any decomposition algorithm that decomposes noise in the PAM-n signal 18 into noise components 59. FIG. 8 is a flow diagram that shows a process for performing a noise decomposition algorithm on the PAM-4 signal 51 of FIG. 2, in accordance with an embodiment of the present disclosure. As illustrated, the controller 34 may, for each data level 52, perform a voltage interval error (VIE) extraction 110 to extract noise from the PAM-4 signal 51. The controller 34 may perform a noise probability distribution function (PDF) analysis 112 (e.g., using the PDF analyzer 27) and a noise spectrum analysis 114 (e.g., using the spectrum analyzer 28) on the extracted noise for each data level 52 to determine the one or more noise components 59, such as, for each data level p: data-dependent noise (i.e., DDN<n, p>), periodic noise/sinusoidal noise (i.e., PN/SN<n, p>), bounded uncorrelated noise (i.e., BUN<n, p>), random noise (i.e., RN<n, p>), and the like.

In some embodiments, the controller 34 may de-embed the effect of the FIR filter 21 as described in process block 76 to further extract and decompose jitter and noise at a later part of the communication link 23. As an example, if the controller 34 determines that the FIR filter 21 generates 0.1 picoseconds (ps) of bounded uncorrelated jitter (i.e., BUJ<n, m>) and the controller 34 determines that there is 0.8 ps of BUJ at the receiver 22, the controller 34 may determine that the channel 20 and the receiver 22 contribute approximately 0.7 ps of BUJ to the communication link 23. As such, de-embedding the effect of the FIR filter 21 may be used, not just to remove the effect of the FIR filter 21, but also to more accurately determine contribution of jitter and/or noise by other components of the communication link 23. In this manner, the method 70 for extracting and analyzing jitter and noise of the PAM-n signal 18 may enable developers to improve design of the communication link 23.

The controller 34 may then adjust (process block 116) or send an instruction to adjust the communication link 23 based on the one or more jitter components 63 and/or the one or more noise components 59. In some embodiments, the controller 34 may generate a model of the communication link 23 based on the PAM-n signal 18, the transmitter 16, the channel 20, the receiver 22, or any combination thereof. The controller 34 may then calibrate the model of the communication link 23 based on the one or more jitter components 63 and/or the one or more noise components 59. The model of the communication link 23 may then be used to determine which portions of the communication link 23 (e.g., the transmitter 16, the channel 20, the receiver 22, or any combination thereof) to adjust based on the one or more jitter components 63 and/or the one or more noise components 59. For example, adjusting the communication link 23 may include moving components (e.g., in the system 10, a model of the system 10, and the like) related to jitter and/or noise, adjusting connections related to jitter and/or noise, replacing components related to jitter and/or noise, and the like, based on the one or more jitter components 63 and/or the one or more noise components 59.

Techniques for improving data recovery in signal communication, and more particularly to extracting and decomposing jitter and noise in received n-level Pulse Amplitude Modulated (PAM-n) signals, are disclosed. By decomposing a PAM-n signal received over a communication link into jitter and noise components, PAM-n communication performance may be improved by adjusting the communication link to compensate for the jitter and noise in the PAM-n signal. Moreover, jitter and/or noise as a result of transmitter pre-emphasis may be identified and compensated for.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a receiver that receives an n-level Pulse Amplitude Modulated (PAM-n) signal via an input/output channel, wherein n is greater than 1;
signal processing circuitry coupled to the receiver that extracts and decomposes jitter in the PAM-n signal into one or more jitter components or extracts and decomposes noise in the PAM-n signal into one or more noise components; and
a controller communicatively coupled to the receiver, wherein the controller:
determines sampling times of the PAM-n signal;
determines one or more slicing levels of the PAM-n signal; and
sends an instruction to adjust the input/output channel, the receiver, or a combination thereof, based at least in part on the one or more jitter components, the one or more noise components, or both.

2. The system of claim 1, wherein the input/output channel is coupled to a transmitter that transmits the PAM-n signal.

3. The system of claim 2, wherein the transmitter comprises a finite impulse response filter.

4. The system of claim 3, wherein the controller de-embeds an effect of the finite impulse response filter on the PAM-n signal.

5. The system of claim 1, wherein the controller determines whether the sampling times and the one or more slicing levels are stable.

6. The system of claim 5, wherein the controller iterates through determining the sampling times of the PAM-n signal and determining the one or more slicing levels of the PAM-n signal when the controller determines that the sampling times and the one or more slicing levels are not stable.

7. The system of claim 6, wherein the controller stops iterating through determining the sampling times of the PAM-n signal and determining the one or more slicing levels of the PAM-n signal when the controller determines that the sampling times and the one or more slicing levels are stable.

8. An integrated circuit comprising:
a receiver coupled to an input/output channel that receives an n-level Pulse Amplitude Modulated (PAM-n) signal, wherein n is greater than 1; and
signal processing circuitry coupled to the receiver that:
extracts and decomposes jitter in the PAM-n signal into one or more jitter components or extracts and decomposes noise in the PAM-n signal into one or more noise components;
sends an indication of the one or more jitter components or the one or more noise components to a controller;
receives an adjustment to the receiver based on the indication of the one or more jitter components or the one or more noise components from the controller; and
adjusts the receiver based on the adjustment to the receiver.

9. The integrated circuit of claim 8, wherein the signal processing circuitry comprises a time interval error generator that extracts jitter from the PAM-n signal or a voltage interval error generator that extracts noise from the PAM-n signal.

10. The integrated circuit of claim 8, wherein the signal processing circuitry comprises a probability distribution function analyzer that uses random probability distribution analysis to determine jitter, noise, or both in the PAM-n signal.

11. The integrated circuit of claim 8, wherein the signal processing circuitry comprises a spectrum analyzer that uses amplitude and frequency of the PAM-n signal to determine jitter, noise, or both in the PAM-n signal.

12. The integrated circuit of claim 8, wherein the signal processing circuitry comprises jitter decomposition circuitry that decomposes the jitter in the PAM-n signal into the one or more jitter components or noise decomposition circuitry that decomposes the noise in the PAM-n signal into the one or more noise components.

13. The integrated circuit of claim 12, wherein the one or more jitter components comprise data-dependent jitter, periodic jitter, sinusoidal jitter, bounded uncorrelated jitter, random jitter, or any combination thereof.

14. The integrated circuit of claim 12, wherein the one or more noise components comprise data-dependent noise, periodic noise, sinusoidal noise, bounded uncorrelated noise, random noise, or any combination thereof.

15. A method comprising:
receiving an n-level Pulse Amplitude Modulated (PAM-n) signal at a receiver from a transmitter via a channel, wherein n is greater than 1;
determining sampling times of the PAM-n signal;
determining one or more slicing levels of the PAM-n signal;
extracting and decomposing jitter in the PAM-n signal for each slicing level of the PAM-n signal to determine one or more jitter components;
extracting and decomposing noise in the PAM-n signal for each data level of the PAM-n signal to determine one or more noise components; and
sending one or more instructions to adjust the receiver, the transmitter, the channel, or any combination thereof, based at least in part on the one or more jitter components, the one or more noise components, or both.

16. The method of claim 15, comprising determining whether the sampling times and the one or more slicing levels are stable.

17. The method of claim 16, comprising iterating through determining the sampling times of the PAM-n signal and determining the one or more slicing levels of the PAM-n signal in response to determining that the sampling times and the one or more slicing levels are not stable.

18. The method of claim 15, comprising determining whether the transmitter applied a finite impulse response filter to the PAM-n signal.

19. The method of claim 18, comprising de-embedding an effect of applying the finite impulse response filter on the PAM-n signal.

20. The method of claim 19, wherein:
extracting and decomposing the jitter in the PAM-n signal is based at least in part on the effect of applying the finite impulse response filter on the PAM-n signal; or
extracting and decomposing the noise in the PAM-n signal is based at least in part on the effect of applying the finite impulse response filter on the PAM-n signal.

* * * * *